US008938569B1

(12) United States Patent
Frangioso et al.

(10) Patent No.: US 8,938,569 B1
(45) Date of Patent: Jan. 20, 2015

(54) BMC-BASED COMMUNICATION SYSTEM (75) Inventors: Ralph C. Frangioso, Franklin, MA (US); Jason J. Leone, North Providence, RI (US); Robert W. Beauchamp, Littleton, MA (US); Steven D. Sardella, North Grafton, MA (US); Thomas J. Connor, Winchendon, MA (US)

(73) Assignee: EMC Corporation, Hopkinton, MA (US)

( * ) Notice: Subject to any disclaimer, the term of this patent is extended or adjusted under 35 U.S.C. 154(b) by 951 days.

(21) Appl. No.: 13/077,837

(22) Filed: Mar. 31, 2011

(51) Int. Cl.
*G06F 13/00* (2006.01)
*G06F 3/06* (2006.01)
*G06F 13/40* (2006.01)
*G06F 13/38* (2006.01)
*H04L 12/861* (2013.01)
*H04L 29/08* (2006.01)

(52) U.S. Cl.
CPC ............ *G06F 3/0601* (2013.01); *G06F 3/0689* (2013.01); *G06F 13/4022* (2013.01); *G06F 13/385* (2013.01); *G06F 13/4027* (2013.01); *H04L 49/90* (2013.01); *H04L 29/08549* (2013.01)

USPC ............ 710/316; 710/305; 710/312; 710/52; 370/381; 370/395.7

(58) Field of Classification Search
None
See application file for complete search history.

(56) References Cited

U.S. PATENT DOCUMENTS

| | | | |
|---|---|---|---|
| 7,493,441 B2 * | 2/2009 | Ashmore | 711/5 |
| 7,917,683 B1 * | 3/2011 | Chamseddine et al. | 710/315 |
| 8,429,325 B1 * | 4/2013 | Onufryk et al. | 710/316 |
| 2007/0153694 A1 * | 7/2007 | Gustin | 370/235 |
| 2008/0052443 A1 * | 2/2008 | Cassiday et al. | 710/316 |
| 2009/0055665 A1 * | 2/2009 | Maglione et al. | 713/320 |
| 2010/0088456 A1 * | 4/2010 | Chu et al. | 710/316 |

* cited by examiner

*Primary Examiner* — Kibrom T Hailu
(74) *Attorney, Agent, or Firm* — Holland & Knight LLP; Brian J. Colandreo, Esq.; Mark H. Whittenberger, Esq.

(57) ABSTRACT

A storage network includes at least one storage processor. At least one switch is coupled to the at least one storage processor. At least one nontransparent bridge is coupled to the at least one switch. The at least one nontransparent bridge includes at least one addressable endpoint. At least one storage device is coupled to the nontransparent bridge. At least one baseboard management controller is coupled to the at least one addressable endpoint.

20 Claims, 3 Drawing Sheets

BMC-BASED COMMUNICATION SYSTEM

TECHNICAL FIELD

This disclosure relates to storage systems and, more particularly, to high availability storage systems.

BACKGROUND

Storing and safeguarding electronic data is of paramount importance in modern business. Accordingly, various systems may be employed to protect such electronic data.

For example, disk arrays may be employed that contain multiple storage devices. Disk arrays may provide some level of redundancy by use of mirrored or redundant components (e.g., disk drives, disk controllers, power supplies and/or fans), each of which may be hot-swappable to avoid downtime.

Disk arrays may fall into a plurality of categories, such as Network Attached Storage (NAS) and Storage Area Networks (SAN). An NAS may be a stand-alone, network-accessible, hard disk storage system that may provide file-level access to electronic data. A SAN array may be a dedicated storage system that may connect numerous storage resources to one or many servers.

SUMMARY OF DISCLOSURE

In a first implementation, a storage network includes at least one storage processor. At least one switch is coupled to the at least one storage processor. At least one nontransparent bridge is coupled to the at least one switch. The at least one nontransparent bridge includes at least one addressable endpoint. At least one storage device is coupled to the nontransparent bridge. At least one baseboard management controller is coupled to the at least one addressable endpoint.

One or more of the following features may be included. A PCI Express network may couple the at least one storage processor to the at least one switch. The at least one storage processor may be configured in a high availability fashion and may include a plurality of storage processors. The at least one storage device may include a plurality of hard disk drives. The at least one storage device may include a plurality of flash disk drives. The baseboard management controller may be configured to receive a plurality of condition messages concerning one or more components of the storage network. The baseboard management controller may be configured to filter the plurality of condition messages. Filtering the plurality of condition messages may include: providing critical condition messages to the at least one storage processor; and blocking non-critical condition messages from the at least one storage processor. The plurality of condition messages may be IPMI-compliant condition messages.

In another implementation, a storage network includes at least one storage processor. At least one switch is coupled to the at least one storage processor. At least one nontransparent bridge is coupled to the at least one switch. The at least one nontransparent bridge includes at least one addressable endpoint. At least one storage device is coupled to the nontransparent bridge. The at least one storage device includes a plurality of flash disk drives. At least one baseboard management controller is coupled to the at least one addressable endpoint. The baseboard management controller is configured to filter the plurality of condition messages. Filtering the plurality of condition messages includes: providing critical condition messages to the at least one storage processor and blocking non-critical condition messages from the at least one storage processor.

One or more of the following features may be included. A PCI Express network for may couple the at least one storage processor to the at least one switch. The at least one storage processor may be configured in a high availability fashion and may include a plurality of storage processors. The plurality of condition messages may be IPMI-compliant condition messages.

In another implementation, a storage network includes at least one storage processor. The at least one storage processor is configured in a high availability fashion and includes a plurality of storage processors. At least one switch is coupled to the at least one storage processor. A PCI Express network couples the at least one storage processor to the at least one switch. At least one nontransparent bridge is coupled to the at least one switch. The at least one nontransparent bridge includes at least one addressable endpoint. At least one storage device is coupled to the nontransparent bridge. At least one baseboard management controller is coupled to the at least one addressable endpoint.

One or more of the following features may be included. The at least one storage device may include a plurality of hard disk drives. The at least one storage device may include a plurality of flash disk drives. The baseboard management controller may be configured to receive a plurality of condition messages concerning one or more components of the storage network. The baseboard management controller may be configured to filter the plurality of condition messages. Filtering the plurality of condition messages may include: providing critical condition messages to the at least one storage processor; and blocking non-critical condition messages from the at least one storage processor. The plurality of condition messages may be IPMI-compliant condition messages.

In another implementation, a storage network includes at least one switch. At least one nontransparent bridge is coupled to the at least one switch. The at least one nontransparent bridge includes at least one addressable endpoint. At least one storage device is coupled to the nontransparent bridge. At least one baseboard management controller is coupled to the at least one addressable endpoint.

One or more of the following features may be included. The storage network may include at least one storage processor. The at least one switch is coupled to the at least one storage processor. A PCI Express network may couple the at least one storage processor to the at least one switch. The at least one storage processor may be configured in a high availability fashion and may include a plurality of storage processors.

The details of one or more implementations are set forth in the accompanying drawings and the description below. Other features and advantages will become apparent from the description, the drawings, and the claims.

DETAILED DESCRIPTION OF THE PREFERRED EMBODIMENTS

System Overview

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
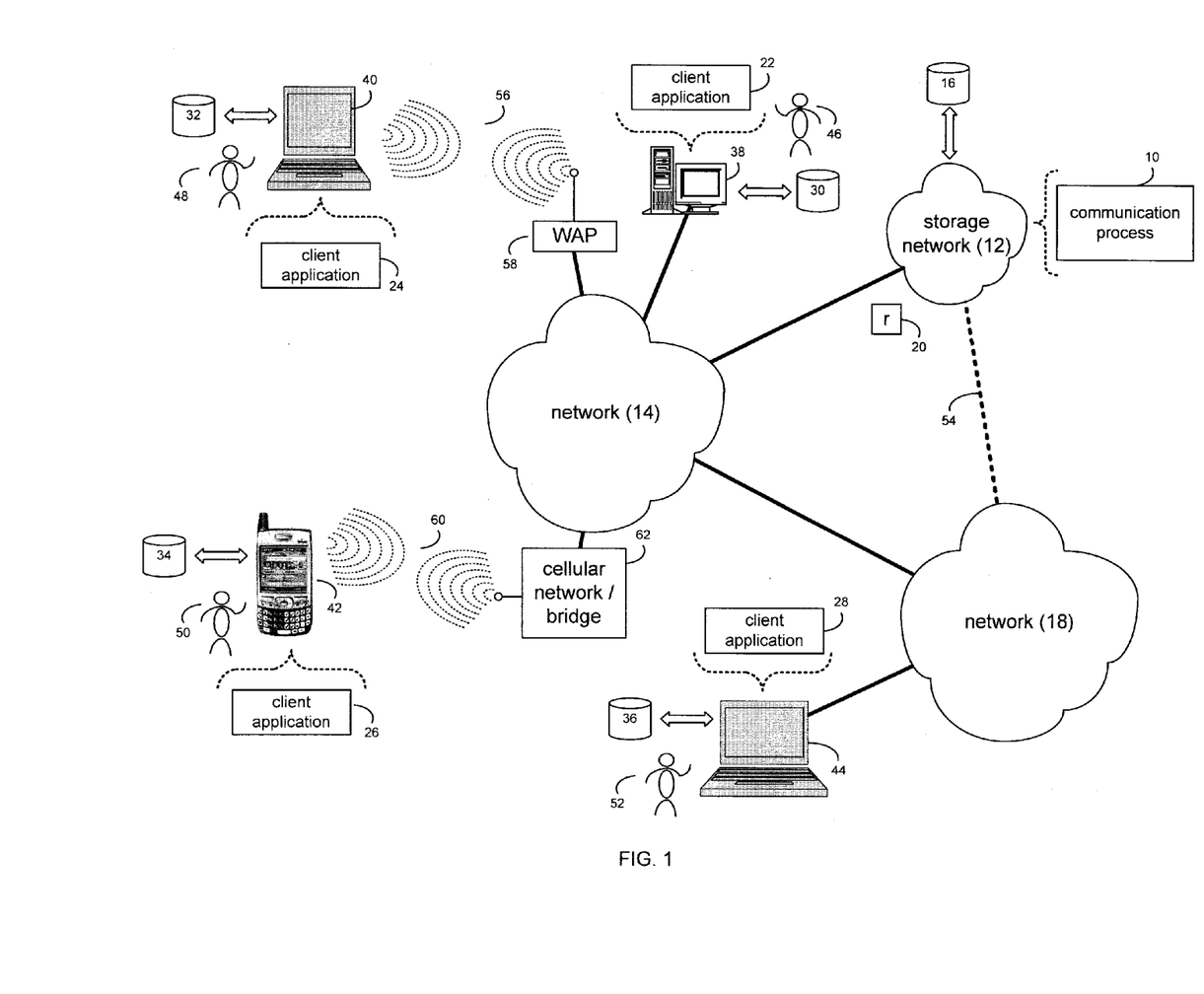
FIG. 1 is a diagrammatic view of a storage network and a communication process coupled to a distributed computing network.

Referring to FIG. 1, there is shown communication process 10 that may reside on and may be executed by storage network 12, which may be connected to network 14 (e.g., the Internet or a local area network). Examples of storage network 12 may include, but are not limited to: a Network Attached Storage (NAS) system and a Storage Area Network (SAN). As will be discussed below in greater detail, a SAN may include one or more of a personal computer, a server computer, a series of server computers, a mini computer, a mainframe computer, a RAID array and an NAS. The various components of storage network 12 may execute one or more operating systems, examples of which may include but are not limited to: Microsoft Windows XP Server™; Novell Netware™; Redhat Linux™, Unix, or a custom operating system, for example.

As will be discussed below in greater detail, communication process 10 may receive, on a baseboard management controller coupled to an addressable endpoint of a nontransparent bridge included within storage network 12, a plurality of condition messages concerning one or more components of storage network 12. The plurality of condition messages may be filtered into critical condition messages and non-critical condition messages.

The instruction sets and subroutines of communication process 10, which may be stored on storage device 16 included within storage network 12, may be executed by one or more processors (not shown) and one or more memory architectures (not shown) included within storage network 12. Storage device 16 may include but is not limited to: a hard disk drive; a tape drive; an optical drive; a RAID array; a random access memory (RAM); a read-only memory (ROM); and flash memory.

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage network 12. Examples of data request 20 may include but are not limited to data write requests (i.e. a request that a data segment be written to storage network 12) and data read requests (i.e. a request that a data segment be read from storage network 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage network 12 directly through network 14 or through secondary network 18. Further, storage network 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

Figure 2:
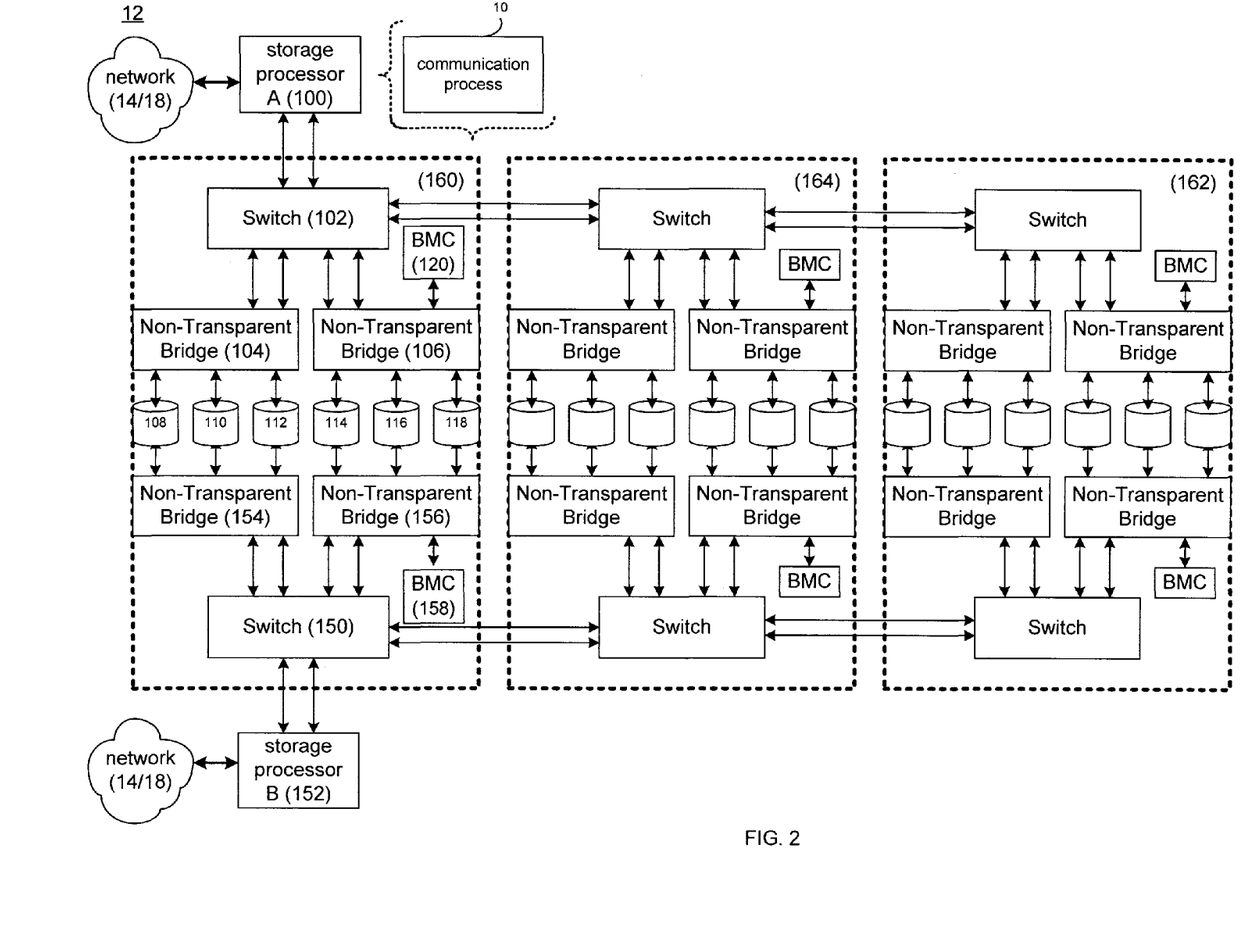
FIG. 2 is a diagrammatic view of the storage network of FIG. 1.

The Communication Process:

Referring also to FIG. 2, storage network 12 may include at least one storage processor (e.g. storage processor 100), examples of which may include but are not limited the types of storage processors included within the CLARiiON series arrays offered by The EMC Corporation of Hopkinton, Mass. While storage network 12 is shown to include a single storage processor (i.e. storage processor 100), this is for illustrative purposes only and is not intended to be a limitation of this disclosure, as other configurations are possible and are considered to be within the scope of this disclosure. For example, storage network 12 may be configured in a high availability fashion and one or more additional storage processors storage processors (not shown) may be included within storage network 12. In the event that storage network 12 includes a plurality of storage processors, each storage processor may be configured as a hot-swappable field replaceable unit (FRU).

Storage processor 100 may be configured to allow for front-end connectivity to "hosts". Examples of such hosts may include but are not limited to the various computers, servers, and client electronic devices that are connected to e.g. networks 14, 18. Additionally, storage processor 100 may be configured to allow for back-end connectivity to various disk arrays, which will be discussed below in greater detail.

The storage processors (e.g. storage processor 100) included within storage network 12 may include cache memory (not shown) that may be segmented into read cache memory (not shown) and write cache memory (not shown). Read cache memory may be used for staging/prefetching data for filling data read requests received from a host and write cache memory may be used to accelerate data write request received from a host.

At least one switch (e.g., switch 102) may be coupled to the storage processors (e.g., storage processor 100). An example of switch 102 may include but is not limited to a PCI Express compliant switch, such as an 8648 switch manufactured by PLX Technology of Sunnyvale, Calif. Being a switch, switch 102 may be configured to be transparent, thus allowing storage processor 100 to "see" the endpoints on the backend of switch 102.

A high-speed network may be used to couple the storage processors (e.g., storage processor 100) and the switches (e.g., switch 102). An example of such a high-speed network may include but is not limited to a PCI Express network. As is known in the art, a PCI Express network is a high-speed peripheral interconnect system developed by Intel. PCI Express was designed to match the higher speeds of modern CPUs. Rather than the shared, parallel bus structure of PCI, PCI Express provides a switched architecture using serial communications channels, each made up of two differential wire pairs that provide 1.0 gigabyte/second in both directions. Up to 16 channels ("lanes") may be combined in ×2, ×4, ×8 and ×16 configurations, creating a parallel interface of independently controlled channels.

At least one nontransparent bridge (e.g., nontransparent bridges 104, 106) may be coupled to the switch (e.g., switch 102). An example of nontransparent bridge 104, 106 may include but is not limited to a PCI Express compliant non-transparent bridge, such as an 8648 nontransparent bridge manufactured by PLX Technology of Sunnyvale, Calif.

While described as nontransparent bridges, nontransparent bridges 104, 106 may be configured as network switches that include nontransparent bridge functionality. Alternatively, nontransparent bridges 104, 106 may be configured by combining a traditional switch with a nontransparent bridge. A high-speed network may be used to couple the switch (e.g., switch 102) and the nontransparent bridges (e.g., nontransparent bridges 104, 106). As discussed above, an example of such a high-speed network may include but is not limited to a PCI Express network.

At power-up, storage processor 10 may perform discovery via the PCI Express network to learn what devices are present on the network. Storage processor 10 may then map the devices via the PCI Express network within the memory space of the network. The PCI specification defines standard PCI-to-PCI bridge configurations (transparent bridging such as that performed by switch 102), which allows storage processor 100 to pass through switches/bridges to discover all the end-points in its address domain.

A nontransparent bridge (e.g., nontransparent bridges 104, 106) may include an intelligent device/processor on both sides of the nontransparent bridge, each with its own independent address domain. Accordingly, the host on one side of the nontransparent bridge may not have complete visibility of the memory or I/O space on the other side of the nontransparent bridge. Accordingly, each processor may consider the other side of the nontransparent bridge as an endpoint and may map it into its own memory space as an endpoint.

At least one storage device (e.g. storage devices 108, 110, 112, 114, 116, 118) may be coupled to the nontransparent bridges (e.g., nontransparent bridges 104, 106). Examples of storage devices 108, 110, 112, 114, 116, 118 may include but are not limited to a plurality of electromechanical hard disk drives and/or a plurality of solid-state flash disk drives.

While in this particular example, storage network 12 is shown to include six storage devices (e.g. storage devices 108, 110, 112, 114, 116, 118), this is for illustrative purposes only and is not intended to be a limitation of this disclosure. Specifically, the actual number of storage devices may be increased or decreased depending upon e.g. the level of redundancy/performance/capacity required.

The manner in which storage network 12 is implemented may vary depending upon e.g. the level of redundancy/performance/capacity required. For example, storage network 12 may be a RAID array in which storage devices 108, 110, 112, 114, 116, 118 are individual "hot-swappable" disk drives.

The nontransparent bridges (e.g., nontransparent bridges 104, 106) may include at least one addressable endpoint (not shown). As is known in the art, an addressable endpoint is an endpoint that is visible through a nontransparent bridge. At least one baseboard management controller (e.g., BMC 120) may be coupled to one such addressable endpoint (e.g., an addressable endpoint (not shown) of nontransparent bridge 106), thus allowing BMC 120 to be visible through the nontransparent bridges (e.g., nontransparent bridges 104, 106).

As discussed above, storage network 12 may be configured in a high availability fashion. Therefore, redundant switches (e.g., switch 150 that may be coupled to redundant storage processor 152), redundant nontransparent bridges (e.g., nontransparent bridges 154, 156), and redundant baseboard management controllers (e.g., BMC 158) may be used to redundantly access storage devices 108, 110, 112, 114, 116, 118 (all of which may be mounted within a single chassis (e.g., chassis 160). Further, additional chassis (e.g., chassis 162, 164) may be daisy-chained to chassis 160 to further enhance the capacity of storage network 12.

While a hierarchy of PCI-Express storage controllers could be created using purely transparent bridging, this may suffer from several drawbacks:

The number of buses visible to the storage processor's root complex may expand significantly. Depending on the number of storage controllers, there may not be enough buses in a single PCI Express segment. Enabling multiple PCI segments may not be possible on some root complexes, and would impact BIOS and Software.

All devices may be visible during enumeration, and any enabled PCI Express error messages anywhere in the hierarchy may reach the root complex, and need to be dealt with. Hot-plugging of a storage device, switch board, or any cabling in the path could also cause perturbations that would be visible to the root complex, at a lower level than exists with other protocols (Fibre Channel, SAS, etc.).

A preferred solution is to place one or more nontransparent bridges within the hierarchy between the storage processors and the storage devices. Nontransparent bridges isolate downstream devices from the upstream path, from a bus numbering, enumeration, management, and error handling perspective.

The more upstream within the hierarchy the nontransparent bridge is placed, the greater the amount of switches and devices that can be isolated from the storage processor. But nontransparent bridges may create a separate problem. They must translate the PCI Express Requester ID of each storage device, for routing purposes. This is accomplished through a Requester ID Lookup Table (LUT). The size of the LUT determines the number of devices that can be supported downstream of the switch. Current technology Requester ID LUTs range from 32 to 64 entries. Since there may be a desire to place greater than these numbers of storage devices downstream of the storage processor, the location of the nontransparent bridges must be carefully selected. If the controllers support I/O Virtualization (IOV), each controller may contain multiple Requester IDs, worsening this problem.

The solution is to strategically place the nontransparent bridge within the vertical heirarchy, so that it supports a reasonable fixed number of storage devices (based on LUT limitations), while simultaneously avoiding the daisy-chaining of nontransparent bridges. Using a separate transparent switch for daisy-chaining between each enclosure, and one or more nontransparent bridges downstream of each transparent switch, to fan out to a fixed number of storage devices, limits the number of buses visible to the storage processor during enumeration, limits the required LUT size of any individual nontransparent switch, while still providing management and error isolation for the large number of storage devices.

Figure 3:
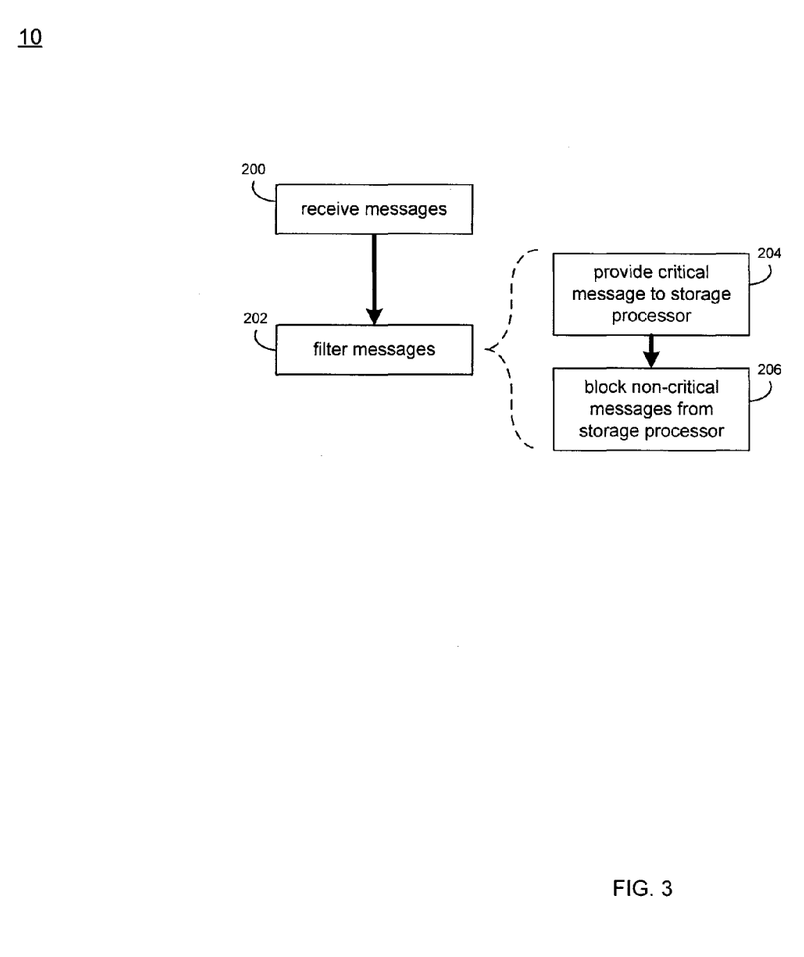
FIG. 3 is a flowchart of the communication process of FIG. 1.

Referring also to FIG. 3 and as discussed above, communication process 10 may receive 200 (on BMC 120 that is coupled to an addressable endpoint (not shown) of nontransparent bridge 106) a plurality of condition messages (not shown) concerning one or more components included within storage network 12. Communication process 10 may filter 202 the plurality of condition messages (not shown) into critical condition messages (not shown) and non-critical condition messages (not shown).

As discussed above, the instruction sets and subroutines of communication process 10, which may be stored on storage device 16 included within storage network 12, may be executed by one or more processors (not shown) and one or more memory architectures (not shown) included within storage network 12. Accordingly, storage device 16 may be a portion of the storage devices (e.g. storage devices 108, 110, 112, 114, 116, 118) included within storage network 12. Alternatively, storage device 16 may be an additional storage device (not shown) included within/coupled to storage network 12.

The plurality of condition messages (not shown) received 200 and filtered 202 by communication process 10 may be IPMI (i.e., Intelligent Platform Management Interface) compliant condition messages. As is known in the art, IPMI is a protocol for monitoring server hardware for various environmental conditions (e.g., chassis temperature, component temperature, component voltage, chassis intrusion, fan speed, etc.). IPMI defines a standard set of messages for use when defining the environmental characteristics of hardware systems/components. Via these IPMI condition messages (not shown), the various sensors may direct data into a baseboard management controller (e.g., BMC 120) for processing.

When communication process 10 filters 202 the condition messages (not shown), communication process 10 may provide 204 critical condition messages (not shown) to storage processor 100 and block 206 non-critical condition messages (not shown) from storage processor 100.

Accordingly, during operation of storage network 12, various condition messages (not shown) may be generated by the various devices included within storage network 12. For example, the various storage devices (e.g. storage devices 108, 110, 112, 114, 116, 118) included within storage network 12 may generate messages concerning their e.g. temperature, rotational speed, storage capacity, etc. Further, various environmental sensors included within storage network 12 may monitor various environmental conditions such as temperature and humidity. Additionally, other devices included within storage network 12 (e.g. power supplies, cooling fans) may provide messages concerning: fan speed, CFM throughput, output voltage, etc.

As discussed above, communication process 10 may receive 200 these condition messages (not shown) on BMC 120 (that is coupled to an addressable endpoint of nontransparent bridge 106). Further and as discussed above, communication process 10 may filter 202 these condition messages (not shown) so that only critical condition messages (not shown) are provided 204 to storage processor 100 (while noncritical condition messages (not shown) are blocked 206 and, therefore, are not provided to e.g. storage processor).

For illustrative purposes, noncritical condition messages (not shown) may be considered by communication process 10 to be those that report environmental conditions within storage network 12 that are considered to be within a normal operating range. Further and for illustrative purposes, critical condition messages (not shown) may be considered by communication process 10 to be those that report environmental conditions within storage network 12 that are outside of the normal operating range.

Alternatively and for illustrative purposes, noncritical condition messages (not shown) may be considered by communication process 10 to be those that even include condition messages that report environmental conditions that are outside of the normal operating range. However, in the event that the environmental condition that is outside of the normal operating range fails to be corrected within a defined period of time, such a noncritical condition messages (not shown) may be escalated by communication process 10 to a critical condition messages (not shown).

For example, assume that a temperature sensor within chassis 160 generates a condition messages (not shown) that reports a chassis temperature of 100° F. Further assume that a normal operating range for such chassis temperature is 80° F.-120° F. Accordingly, this condition messages (not shown) would be deemed noncritical by communication process 10, as the chassis temperature reported is within the normal operating range. Accordingly, such a noncritical condition messages (not shown) would be blocked 206 by communication process 10 and, therefore, not provided to storage processor 100.

Further, assume that the same temperature sensor within chassis 160 generates a condition messages (not shown) and reports a chassis temperature of 130°. Since this condition messages (not shown) reports a temperature that is outside of the normal operating range, this condition messages (not shown) may be deemed either noncritical or critical by communication process 10 (depending upon the manner in which communication process 10 is configured). If such a condition messages (not shown) is deemed noncritical by communication process 10, such a noncritical condition messages (not shown) would be blocked 206 and not provided to storage processor 100. However, if such a condition messages (not shown) is deemed critical by communication process 10, such a critical message would be provided 204 to storage processor 100.

Assume for illustrative purposes that upon receiving the condition message (not shown) that reports a chassis temperature 130°, storage network 12 may increase the rotational speed of a cooling fan (not shown) included within chassis 160 in an attempt to reduce the chassis temperature. In the event that such an action by storage network 12 decreases the temperature within chassis 160 to 110° F., a condition message (not shown) may be generated that reports a chassis temperature within a normal operating range (which would be deemed noncritical by communication process 10 and, therefore, blocked from storage processor 100).

However, in the event that such an action by storage network 12 does not result in the internal temperature of chassis 160 being reduced to within the normal operating range, such a condition message (not shown) reporting a higher-than-normal temperature may be deemed critical by communication process 10 and thus provided 204 to storage processor 100.

By filtering 202 the condition messages (not shown) received by BMC 120 into critical condition messages (not shown) and noncritical condition messages (not shown), wherein only the critical condition messages (not shown) are provided to storage processor 100, the quantity of condition messages (not shown) provided to storage processor 100 is reduced. Accordingly, those condition messages (not shown) that are noncritical may be processed by the BMC 120, as opposed to being provided to storage processor 100.

When communication process 10 provides 204 critical condition messages (not shown) to storage processor 100, this may be performed a variety fashions. For example, the critical condition messages (not shown) may be pushed to storage processor 100 by BMC 120. Alternatively, the critical condition messages (not shown) may be stored within BMC 120 in an area that is remotely accessible by storage processor 100 via e.g., the above-described addressable endpoint. Accordingly, such critical condition messages (not shown) may be retrieved by storage processor 100 at a frequency controlled by/defined by storage processor 100.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A storage network comprising:
   at least one storage processor;
   at least one switch coupled to the at least one storage processor;
   a plurality of nontransparent bridges coupled to the at least one switch, wherein each of the plurality of nontransparent bridges include at least one addressable endpoint;
   at least one storage device coupled to the plurality of nontransparent bridges; and
   a plurality of baseboard management controllers each coupled to a separate nontransparent bridge via the at least one addressable endpoint;
   wherein at least one of the plurality of baseboard management controllers is configured to receive a plurality of condition messages concerning one or more components of the storage network;
   wherein the at least one of the plurality of baseboard management controllers is configured to escalate a noncritical condition message to a critical condition message if the noncritical condition message fails to be corrected within a defined period of time.

2. The storage network of claim 1 further comprising:
   a PCI Express network for coupling the at least one storage processor to the at least one switch.

3. The storage network of claim 1 wherein the at least one storage processor is configured in a high availability fashion and includes a plurality of storage processors.

4. The storage network of claim 1 wherein the at least one storage device includes a plurality of hard disk drives.

5. The storage network of claim 1 wherein the at least one storage device includes a plurality of flash disk drives.

6. The storage network of claim 1 wherein the plurality of baseboard management controllers are configured to filter the plurality of condition messages, wherein filtering the plurality of condition messages includes:
   providing critical condition messages to the at least one storage processor; and
   blocking non-critical condition messages from the at least one storage processor.

7. The storage network of claim 1 wherein the plurality of condition messages are IPMI-compliant condition messages.

8. A storage network comprising:
   at least one storage processor;
   at least one switch coupled to the at least one storage processor;
   a plurality of nontransparent bridges coupled to the at least one switch, wherein each of the plurality of nontransparent bridges include at least one addressable endpoint;
   at least one storage device coupled to the plurality of nontransparent bridges, wherein the at least one storage device includes a plurality of flash disk drives; and
   a plurality of baseboard management controllers each coupled to a separate nontransparent bridge via the at least one addressable endpoint, wherein the plurality of baseboard management controllers are configured to filter the plurality of condition messages, wherein filtering the plurality of condition messages includes:
   providing critical condition messages to the at least one storage processor;
   blocking non-critical condition messages from the at least one storage processor; and
   if a noncritical condition fails to be corrected within a defined period of time, escalating the noncritical condition message to a critical condition message.

9. The storage network of claim 8 further comprising:
   a PCI Express network for coupling the at least one storage processor to the at least one switch.

10. The storage network of claim 8 wherein the at least one storage processor is configured in a high availability fashion and includes a plurality of storage processors.

11. The storage network of claim 8 wherein the plurality of condition messages are IPMI-compliant condition messages.

12. A storage network comprising:
    at least one storage processor, wherein the at least one storage processor is configured in a high availability fashion and includes a plurality of storage processors;
    at least one switch coupled to the at least one storage processor;
    a PCI Express network for coupling the at least one storage processor to the at least one switch;
    a plurality of nontransparent bridges coupled to the at least one switch, wherein each of the plurality of nontransparent bridges include at least one addressable endpoint;
    at least one storage device coupled to the plurality of nontransparent bridges; and
    a plurality of baseboard management controllers each coupled to a separate nontransparent bridge via the at least one addressable endpoint;
    wherein at least one of the plurality of baseboard management controllers is configured to receive a plurality of condition messages concerning one or more components of the storage network;

wherein the at least one of the plurality of baseboard management controllers is configured to escalate a noncritical condition message to a critical condition message if the noncritical condition message fails to be corrected within a defined period of time.

13. The storage network of claim 12 wherein the at least one storage device includes a plurality of hard disk drives.

14. The storage network of claim 12 wherein the at least one storage device includes a plurality of flash disk drives.

15. The storage network of claim 12 wherein the plurality of baseboard management controllers are configured to filter the plurality of condition messages, wherein filtering the plurality of condition messages includes:
   providing critical condition messages to the at least one storage processor; and
   blocking non-critical condition messages from the at least one storage processor.

16. The storage network of claim 12 wherein the plurality of condition messages are IPMI-compliant condition messages.

17. A storage network comprising:
   at least one switch;
   a plurality of nontransparent bridges coupled to the at least one switch, wherein each of the plurality of nontransparent bridges include at least one addressable endpoint;
   at least one storage device coupled to the plurality of nontransparent bridges; and
   a plurality of baseboard management controllers each coupled to a separate nontransparent bridge via the at least one addressable endpoint;
   wherein at least one of the plurality of baseboard management controllers is configured to receive a plurality of condition messages concerning one or more components of the storage network;
   wherein the at least one of the plurality of baseboard management controllers is configured to escalate a noncritical condition message to a critical condition message if the noncritical condition message fails to be corrected within a defined period of time.

18. The storage network of claim 17 further comprising:
   at least one storage processor, wherein the at least one switch is coupled to the at least one storage processor.

19. The storage network of claim 18 further comprising:
   a PCI Express network for coupling the at least one storage processor to the at least one switch.

20. The storage network of claim 18 wherein the at least one storage processor is configured in a high availability fashion and includes a plurality of storage processors.

* * * * *